(12) United States Patent
Brunet et al.

(10) Patent No.: US 9,535,545 B2
(45) Date of Patent: Jan. 3, 2017

(54) COMMON MODE NOISE SUPPRESSION DURING HOVERING AND PROXIMITY DETECTION

(71) Applicants: Samuel Brunet, Cowes (GB); Richard Paul Collins, Southampton (GB); Luben Hristov Hristov, Sofia (BG); Steinar Myren, Vikhammer (NO); Trond Jarle Pedersen, Trondhelm (NO); Paul Stavely, Southampton (GB)

(72) Inventors: Samuel Brunet, Cowes (GB); Richard Paul Collins, Southampton (GB); Luben Hristov Hristov, Sofia (BG); Steinar Myren, Vikhammer (NO); Trond Jarle Pedersen, Trondhelm (NO); Paul Stavely, Southampton (GB)

(73) Assignee: Atmel Corporation, San Jose, CA (US)

( * ) Notice: Subject to any disclaimer, the term of this patent is extended or adjusted under 35 U.S.C. 154(b) by 192 days.

(21) Appl. No.: 13/930,454

(22) Filed: Jun. 28, 2013

(65) Prior Publication Data
US 2015/0002445 A1    Jan. 1, 2015

(51) Int. Cl.
*G06F 3/044* (2006.01)
*G06F 3/041* (2006.01)

(52) U.S. Cl.
CPC ............. *G06F 3/044* (2013.01); *G06F 3/0418* (2013.01)

(58) Field of Classification Search
None
See application file for complete search history.

(56) References Cited

U.S. PATENT DOCUMENTS

| | | | |
|---|---|---|---|
| 7,663,607 B2 | 2/2010 | Hotelling | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |

(Continued)

FOREIGN PATENT DOCUMENTS

WO    WO 2012/129247    9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,984, filed Mar. 21, 2011, Rothkopf.

*Primary Examiner* — Seokyun Moon
*Assistant Examiner* — Douglas M Wilson
(74) *Attorney, Agent, or Firm* — Baker Botts L.L.P.

(57) ABSTRACT

In one embodiment, a touch sensor includes a touch screen having a plurality of electrodes and a controller. The controller is operable to detect that an object is in proximity to the touch screen by measuring capacitance values from a reference area of the touch screen, determining a reference capacitance value using the measured capacitance values from the reference area, measuring capacitance values from a main area of the touch screen, and suppressing noise from the measured capacitance values of the main area by subtracting the reference capacitance value from the measured capacitance values of the main area of the touch screen. The reference area includes two or more of the plurality of electrodes, and at least one of the electrodes of the reference area is electrically coupled to a voltage reference. The main area includes electrodes of the plurality of electrodes that are not in the reference area.

23 Claims, 9 Drawing Sheets

(56) References Cited

U.S. PATENT DOCUMENTS

| | | |
|---|---|---|
| 8,040,326 B2 | 10/2011 | Hotelling |
| 8,049,732 B2 | 11/2011 | Hotelling |
| 8,179,381 B2 | 5/2012 | Frey |
| 2009/0303198 A1* | 12/2009 | Yilmaz .............. H03K 17/9622 345/173 |
| 2009/0315854 A1 | 12/2009 | Matsuo |
| 2011/0216033 A1* | 9/2011 | Mamba ................ G06F 3/0418 345/174 |
| 2012/0038563 A1* | 2/2012 | Park ...................... G06F 3/0414 345/173 |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2012/0299851 A1* | 11/2012 | Homma ................ G06F 3/0488 345/173 |
| 2013/0015868 A1* | 1/2013 | Peng ...................... G06F 3/044 324/688 |
| 2013/0076612 A1 | 3/2013 | Myers |
| 2014/0168137 A1* | 6/2014 | Pyo ...................... G06F 3/0412 345/174 |

* cited by examiner

COMMON MODE NOISE SUPPRESSION DURING HOVERING AND PROXIMITY DETECTION

TECHNICAL FIELD

This disclosure generally relates to touch sensors.

BACKGROUND

A touch sensor detects the presence and location of a touch or the proximity of an object (such as a user's finger) within a touch-sensitive area of the touch sensor overlaid, for example, on a display screen. In a touch-sensitive-display application, the touch sensor enables a user to interact directly with what is displayed on the screen, rather than indirectly with a mouse or touchpad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are different types of touch sensors, such as (for example) resistive touch screens, surface acoustic wave touch screens, capacitive touch screens, infrared touch screens, and optical touch screens. Herein, reference to a touch sensor encompasses a touch screen, and vice versa, where appropriate. A capacitive touch screen may include an insulator coated with a substantially transparent conductor in a particular pattern. When an object touches or comes within proximity of the surface of the capacitive touch screen, a change in capacitance occurs within the touch screen at the location of the touch or proximity. A controller processes the change in capacitance to determine the touch position(s) on the touch screen.

DESCRIPTION OF EXAMPLE EMBODIMENTS

Proximity detection for capacitive touch screens involves the ability to detect the presence of an external object in the near vicinity to the screen surface without determining the exact spatial position of the object. For example, the typical detection range may vary from 40 mm to 200 mm and more. Hovering detection, however, involves determining the spatial position of the object relative to the surface before the object touches the surface. A typical range for hovering detection may be between 10 mm and 30 mm.

Information from proximity and hovering detection may be used by a touch-sensitive device such as a smart phone or tablet computer in many different ways. For example, proximity event information may be utilized to wake up the device, for changing the behavior of the system, for illuminating the screen, for showing alerts, and the like. As another example, hovering event information may be utilized to determine where a person's finger is located related to the surface of the screen. One of the main challenges in proximity and hovering detection, however, is noise suppression. During a normal touch detection mode, the normalization of the capacitance signals may have noise suppressing effects over common mode noises. Typical normalization techniques (e.g., subtracting the mean value of the signals from each signal) cannot be used for proximity and hovering detection because it reduces the ability of the touch screen to reliably detect objects that are far away from the screen.

The teachings of the disclosure recognize that it would be desirable to perform common mode noise suppression during proximity and hovering detection in a way that does not greatly reduce the ability of the touch screen to reliably detect objects that are far away from the screen. Certain embodiments of the disclosure utilize reference areas of the touch screen in order to determine a reference signal which is then used to suppress common mode noise in other areas of the touch screen. As a result, the touch sensor is able to suppress common mode noise in a way that does not greatly reduce the sensitivity of the touch screen. FIGS. 1 through 6 below illustrate a touch sensor of a touch-sensitive device that suppresses common mode noise during proximity and hovering detection.

Figure 1:
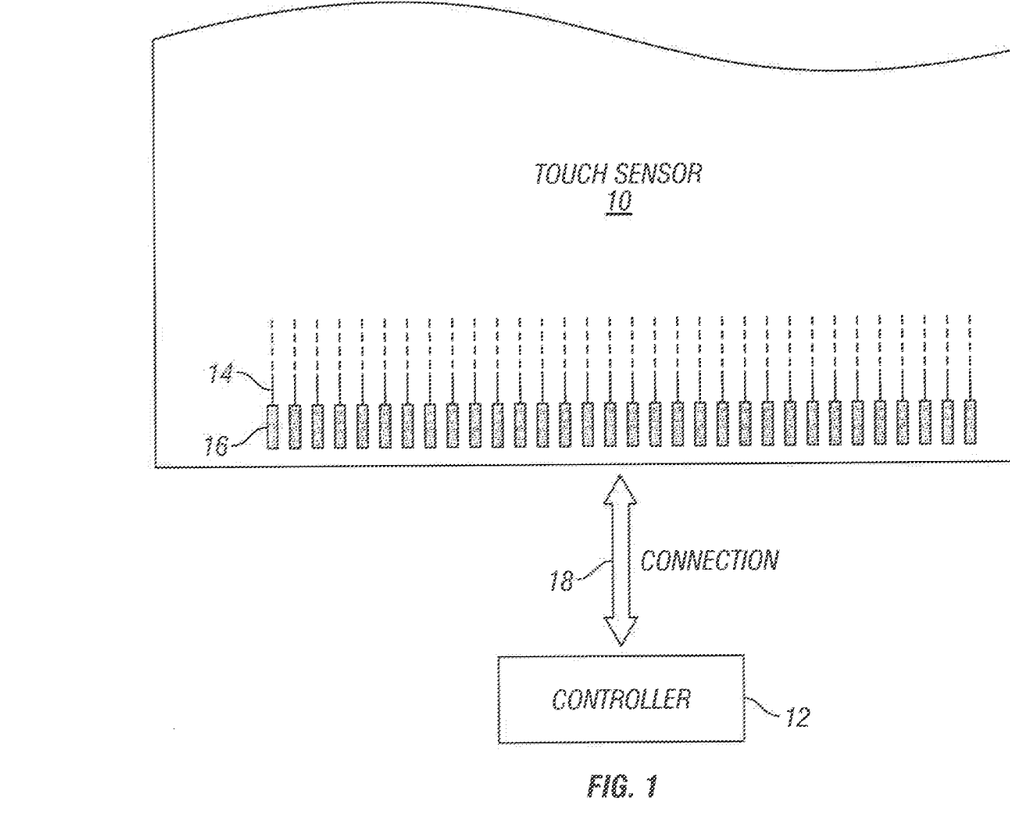
FIG. 1 illustrates an example touch sensor, according to certain embodiments.

FIG. 1 illustrates an example touch sensor 10 with an example controller 12. Herein, reference to a touch sensor may encompass a touch screen, and vice versa, where appropriate. Touch sensor 10 and controller 12 detect the presence and location of a touch or the proximity of an object within a touch-sensitive area of touch sensor 10. Herein, reference to a touch sensor encompasses both the touch sensor and its controller, where appropriate. Similarly, reference to a controller encompasses both the controller and its touch sensor, where appropriate. Touch sensor 10 includes one or more touch-sensitive areas, where appropriate. Touch sensor 10 includes an array of touch electrodes (i.e., drive and/or sense electrodes) disposed on a substrate, which in some embodiments is a dielectric material.

In certain embodiments, one or more portions of the substrate of touch sensor 10 are made of polyethylene terephthalate (PET) or another suitable material. This disclosure contemplates any suitable substrate with any suitable portions made of any suitable material. In particular embodiments, the drive or sense electrodes in touch sensor 10 are made of indium tin oxide (ITO) in whole or in part. In particular embodiments, the drive or sense electrodes in touch sensor 10 are made of fine lines of metal or other conductive material. As an example and not by way of limitation, one or more portions of the conductive material are copper or copper-based and have a thickness of approximately 5 μm or less and a width of approximately 10 μm or less. As another example, one or more portions of the conductive material are silver or silver-based and similarly have a thickness of approximately 5 μm or less and a width of approximately 10 μm or less. This disclosure contemplates any suitable electrodes made of any suitable material.

In certain embodiments, touch sensor 10 implements a capacitive form of touch sensing. In a mutual-capacitance implementation, touch sensor 10 includes an array of drive and sense electrodes forming an array of capacitive nodes. In certain embodiments, a drive electrode and a sense electrode form a capacitive node. The drive and sense electrodes forming the capacitive node come near each other, but do not make electrical contact with each other. Instead, the drive and sense electrodes are capacitively coupled to each other across a gap between them. A pulsed or alternating voltage applied to the drive electrode (i.e., by controller 12) induces a charge on the sense electrode, and the amount of charge induced is susceptible to external influence (such as a touch or the proximity of an object). When an object touches or comes within proximity of the capacitive node, a change in capacitance occurs at the capacitive node and controller 12 measures the change in capacitance. By measuring changes in capacitance throughout the array, controller 12 determines the position of the touch or proximity within the touch-sensitive area(s) of touch sensor 10.

In particular embodiments, one or more drive electrodes together form a drive line running horizontally or vertically or in any suitable orientation. Similarly, one or more sense electrodes together form a sense line running horizontally or vertically or in any suitable orientation. In particular embodiments, drive lines run substantially perpendicular to sense lines. Herein, reference to a drive line encompasses one or more drive electrodes making up the drive line, and vice versa, where appropriate. Similarly, reference to a sense line encompasses one or more sense electrodes making up the sense line, and vice versa, where appropriate.

Figure 4:
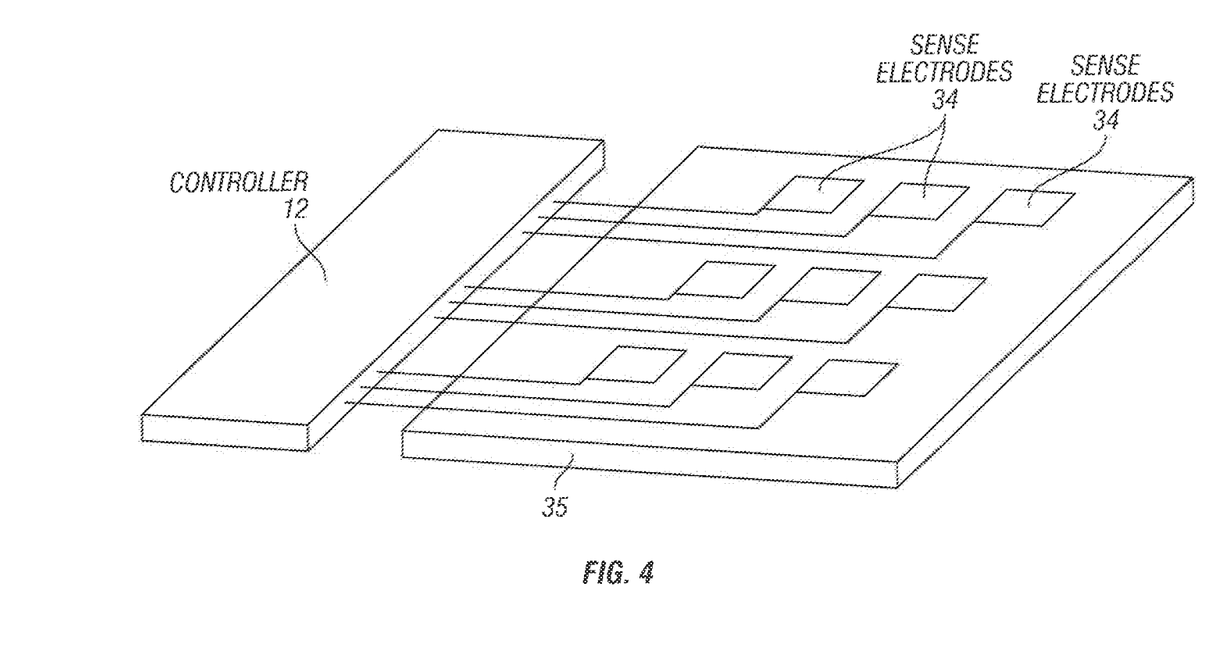
FIG. 4 illustrates another example embodiment of the touch sensor of FIG. 1, according to certain embodiments.

In certain embodiments, touch sensor 10 has a single-layer mutual capacitance configuration, with drive and sense electrodes disposed in a pattern on one side of a substrate. In such a configuration, a pair of drive and sense electrodes capacitively coupled to each other across a space between them forms a capacitive node. In a configuration for a self-capacitance implementation, as illustrated in FIG. 4, electrodes of only a single type (e.g. sense) are disposed in a pattern on the substrate. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Controller 12 is operable to detect and process the change in capacitance to determine the presence and location of the touch or proximity input. Certain embodiments if controller 12 communicate information about the touch or proximity input to one or more other components (such one or more central processing units (CPUs) or digital signal processors (DSPs)) of a device that includes touch sensor 10 and controller 12, which may respond to the touch or proximity input by initiating a function of the device (or an application running on the device) associated with it. Although this disclosure describes a particular controller having particular functionality with respect to a particular device and a particular touch sensor, this disclosure contemplates any suitable controller having any suitable functionality with respect to any suitable device and any suitable touch sensor.

In certain embodiments, controller 12 is one or more integrated circuits (ICs)—such as for example general-purpose microprocessors, microcontrollers, programmable logic devices or arrays, and application-specific ICs (ASICs). In some embodiments, controller 12 is coupled to a flexible printed circuit (FPC) bonded to the substrate of touch sensor 10, as described below. In some mutual capacitance embodiments, controller 12 includes a processor unit, a drive unit, a sense unit, and a storage unit. The drive unit supplies drive signals to the drive electrodes of touch sensor 10. The sense unit senses charge at the capacitive nodes of touch sensor 10 and provides measurement signals to the processor unit representing capacitances at the capacitive nodes. The processor unit controls the supply of drive signals to the drive electrodes by the drive unit and process measurement signals from the sense unit to detect and process the presence and location of a touch or proximity input within the touch-sensitive area(s) of touch sensor 10. The processor unit also tracks changes in the position of a touch or proximity input within the touch-sensitive area(s) of touch sensor 10. The storage unit, which includes one or more memory devices, stores programming for execution by the processor unit, including programming for controlling the drive unit to supply drive signals to the drive electrodes, programming for processing measurement signals from the sense unit, and other suitable programming, where appropriate. In self capacitance embodiments, controller 12 is operable to both drive and measure electrodes that are each individually a sense and drive electrode. Although this disclosure describes a particular controller having a particular implementation with particular components, this disclosure contemplates any suitable controller having any suitable implementation with any suitable components.

Tracks 14 of conductive material disposed on the substrate of touch sensor 10 couple the drive or sense electrodes of touch sensor 10 to connection pads 16, also disposed on the substrate of touch sensor 10. As described below, connection pads 16 facilitate coupling of tracks 14 to controller 12. In certain embodiments, tracks 14 extend into or around (e.g. at the edges of) the touch-sensitive area(s) of touch sensor 10. Particular tracks 14 provide drive connections for coupling controller 12 to drive electrodes of touch sensor 10, through which the drive unit of controller 12 supplies drive signals to the drive electrodes. Other tracks 14 provide sense connections for coupling controller 12 to sense electrodes of touch sensor 10, through which the sense unit of controller 12 senses charge at the capacitive nodes of touch sensor 10. In certain embodiments, tracks 14 are made of fine lines of metal or other conductive material. As an example and not by way of limitation, the conductive material of tracks 14 is copper or copper-based and have a width of approximately 100 μm or less. As another example, the conductive material of tracks 14 is silver or silver-based and have a width of approximately 100 μm or less. In particular embodiments, tracks 14 are made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, certain embodiments of touch sensor 10 include one or more ground lines terminating at a ground connector (similar to a connection pad 16) at an edge of the substrate of touch sensor 10 (similar to tracks 14).

In certain embodiments, connection pads 16 are located along one or more edges of the substrate, outside the touch-sensitive area(s) of touch sensor 10. As described above, controller 12 is on an FPC in certain embodiments. In some embodiments, connection pads 16 are made of the same material as tracks 14 and are bonded to the FPC using an anisotropic conductive film (ACF). In certain embodiments, connection 18 includes conductive lines on the FPC coupling controller 12 to connection pads 16, in turn coupling controller 12 to tracks 14 and to the drive or sense electrodes of touch sensor 10. In another embodiment, connection pads 160 are inserted into an electro-mechanical connector (such as a zero insertion force wire-to-board connector); in this embodiment, connection 180 does not need to include an FPC. This disclosure contemplates any suitable connection 18 between controller 12 and touch sensor 10.

Figure 2:
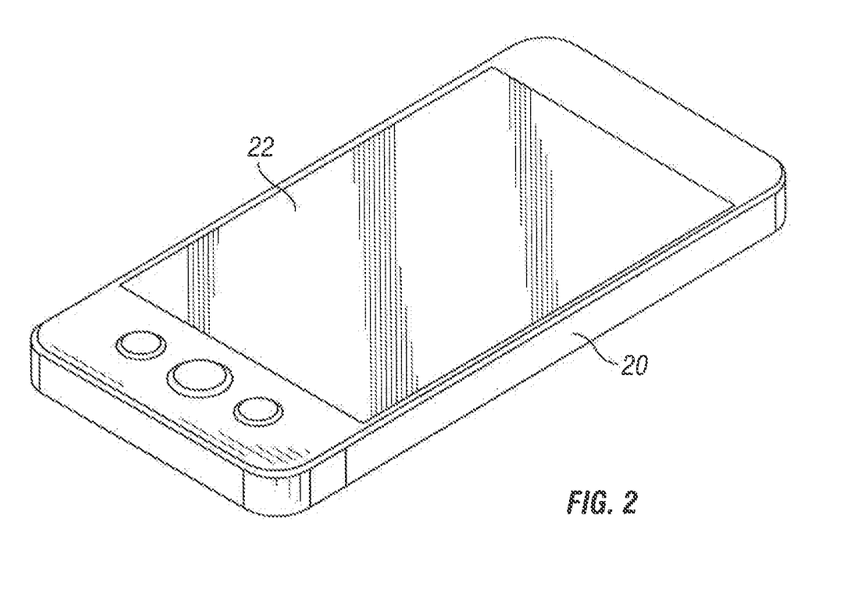
FIG. 2 illustrates an example device that utilizes the touch sensor of FIG. 1, according to certain embodiments.

FIG. 2 illustrates an example device 20 that utilizes touch sensor 10 of FIG. 1. Device 20 includes any personal digital assistant, cellular telephone, smartphone, tablet computer, and the like. For example, a certain embodiment of device 20 is a smartphone that includes a touchscreen display 22 (e.g., screen) occupying a significant portion of the largest surface of the device. In certain embodiments, the large size of touchscreen display 22 enables the touchscreen display 22 to present a wide variety of data, including a keyboard, a numeric keypad, program or application icons, and various other interfaces as desired. In certain embodiments, a user interacts with device 20 by touching touchscreen display 22 with a stylus, a finger, or any other appropriate object in order to interact with device 20 (i.e., select a program for execution or to type a letter on a keyboard displayed on the touchscreen display 22). In certain embodiments, a user interacts with device 20 using multiple touches to perform various operations, such as to zoom in or zoom out when viewing a document or image.

Figure 3:
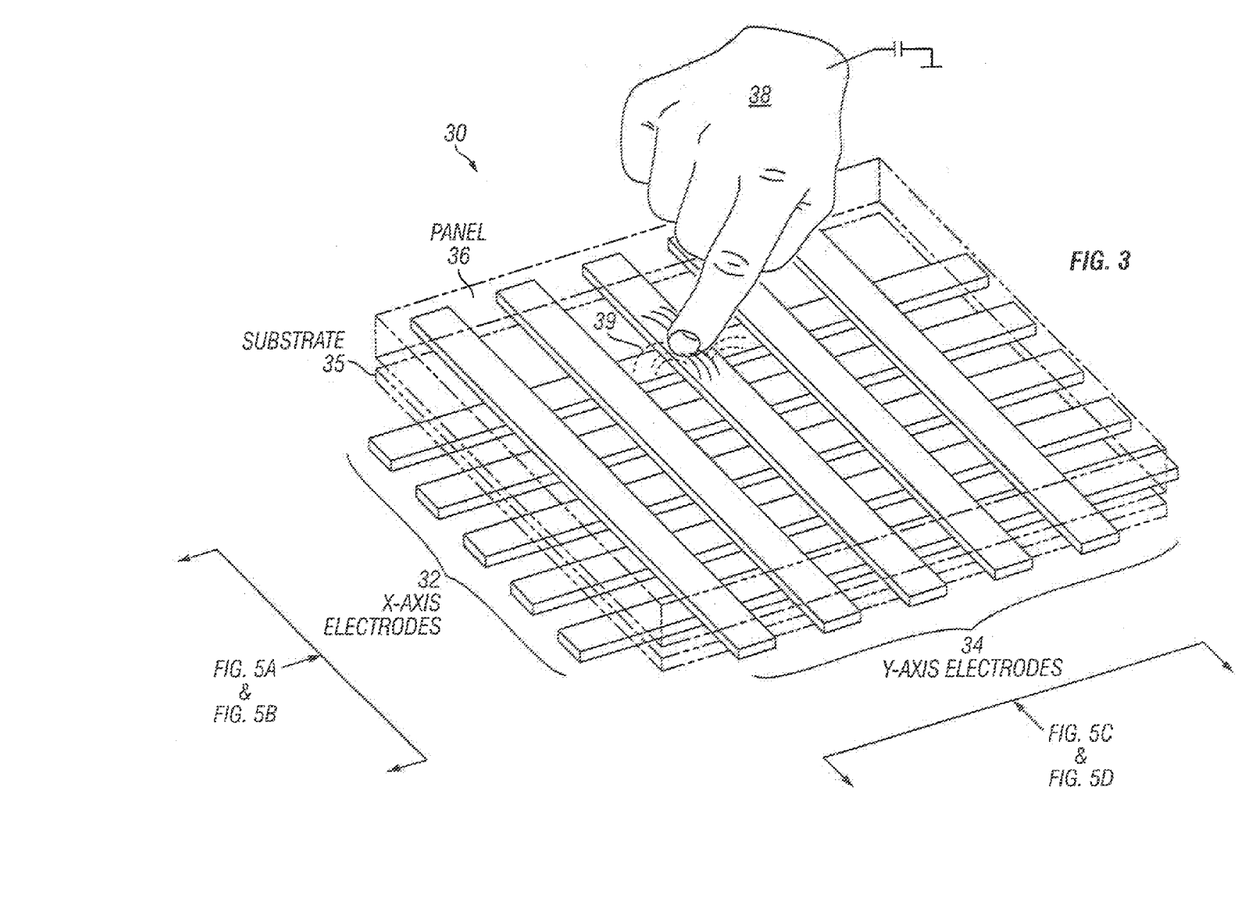
FIG. 3 illustrates an example embodiment of the touch sensor of FIG. 1, according to certain embodiments.

FIG. 3 illustrates a touch sensor 30 that may be utilized as touch sensor 10 of FIG. 1. Touch sensor 30 includes x-axis electrodes 32, y-axis electrodes 34, a substrate 35, and a panel 36. In some embodiments, x-axis electrodes 32 and y-axis electrodes 34 are electrodes in a self capacitance implementation (i.e., each x-axis electrode 32 and y-axis electrode 34 is capable of being driven and measured during the acquisition). In some embodiments, x-axis electrodes 32 are drive electrodes and y-axis electrodes 34 are sense electrodes in a mutual capacitance implementation. In some embodiments, x-axis electrodes 32 and y-axis electrodes 34 have a diamond pattern or any appropriate clone of a diamond pattern.

In some embodiments, panel 36 is a transparent panel. In other embodiments, panel 36 is not transparent. In some embodiments, substrate 35 is sandwiched between x-axis electrodes 32 and y-axis electrodes 34, and y-axis electrodes 34 are coupled to an underside of panel 36 with, for example, an adhesive. In other embodiments, touch sensor 30 includes any appropriate configuration and number of layers of electrodes and substrates. For example, some embodiments of touch sensor 30 include additional layers of sense electrodes 32 that run perpendicular (or any other appropriate angle) to y-axis electrodes 34. In some embodiments, x-axis electrodes 32 and y-axis electrodes 34 are on the same layer in any appropriate pattern (e.g., a design in which x-axis electrodes 32 and y-axis electrodes 34 have interdigitated teeth).

In certain mutual capacitance embodiments, touch sensor 30 determines the location of touch object 38 at least in part by using controller 12 to apply a pulsed a or alternating voltage to x-axis electrodes 32, which induces a charge on y-axis electrodes 34 (or vice versa). In certain self capacitance embodiments, touch sensor 30 determines the location of touch object 38 at least in part by using controller 12 to apply a pulsed or alternating voltage to x-axis electrodes 32 and y-axis electrodes 34. When touch object 38 touches or comes within proximity of an active area of touch sensor 30, a change in capacitance may occur, as depicted by electric field lines 39 in FIG. 3. In mutual capacitance embodiments, the change in capacitance is sensed by the sense (i.e., receiving) electrodes and measured by controller 12. In self capacitance embodiments, the change in capacitance is sensed by x-axis electrodes 32 and y-axis electrodes 34 and measured by controller 12. By measuring changes in capacitance throughout an array of x-axis electrodes 32 and y-axis electrodes 34, controller 12 determines the position of the hovering or proximity within the touch-sensitive area(s) of touch sensor 30.

FIG. 4 illustrates a self-capacitance embodiment of touch sensor 10. In a self-capacitance implementation, touch sensor 10 may include an array of electrodes of a single type that may each form a capacitive node. When an object touches or comes within proximity of the capacitive node, a change in self-capacitance may occur at the capacitive node and controller 12 may measure the change in capacitance, for example, as a change in the amount of charge needed to raise the voltage at the capacitive node by a pre-determined amount. As with a mutual-capacitance implementation, by measuring changes in capacitance throughout the array, controller 12 may determine the position of the touch or proximity within the touch-sensitive area(s) of touch sensor 10. This disclosure contemplates any suitable form of capacitive touch sensing, where appropriate.

Figure 5A:
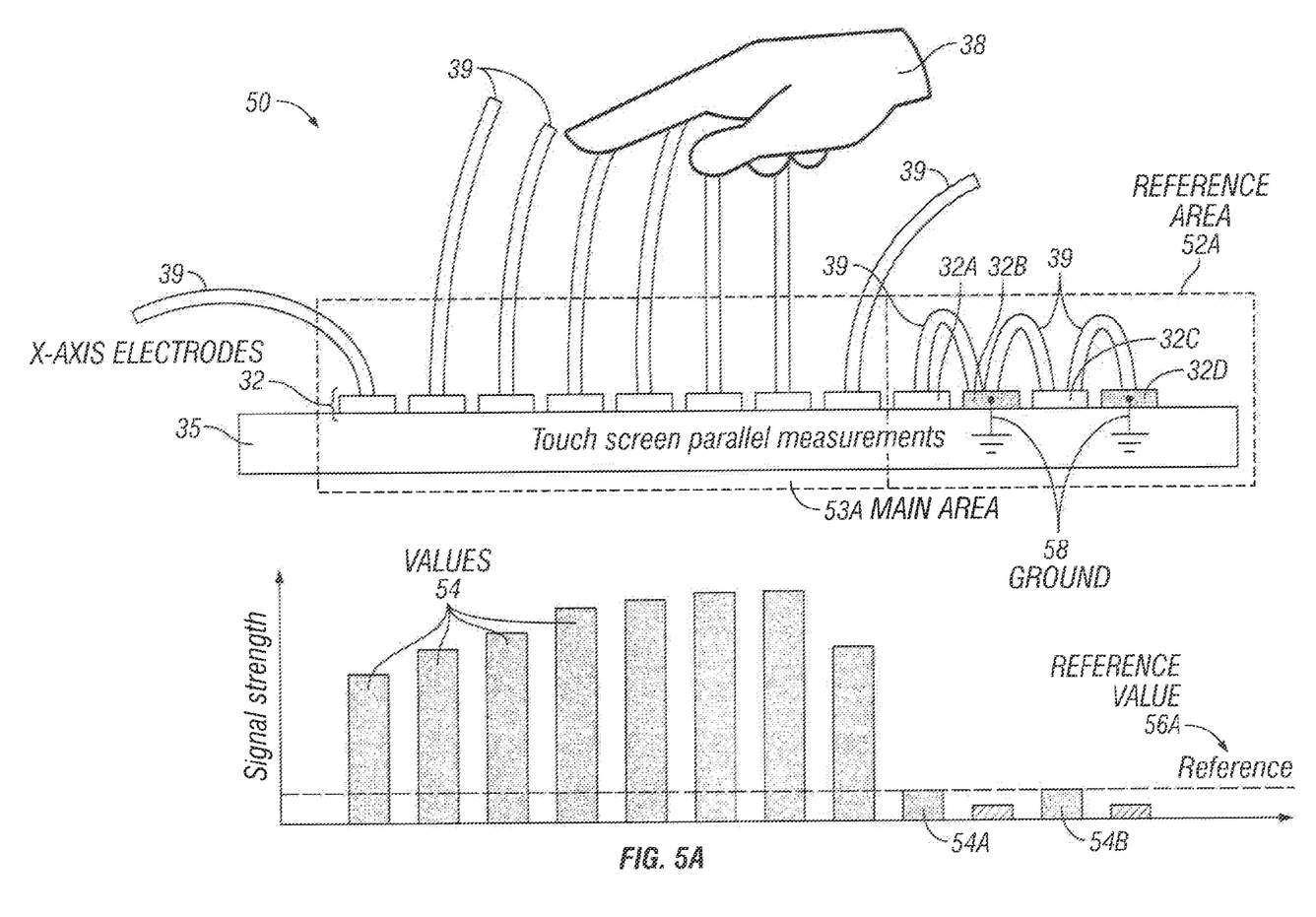
FIGS. 5A-5D illustrate an example touch sensor that performs common mode noise suppression during proximity and hovering detection, according to certain embodiments.
Figure 5B:
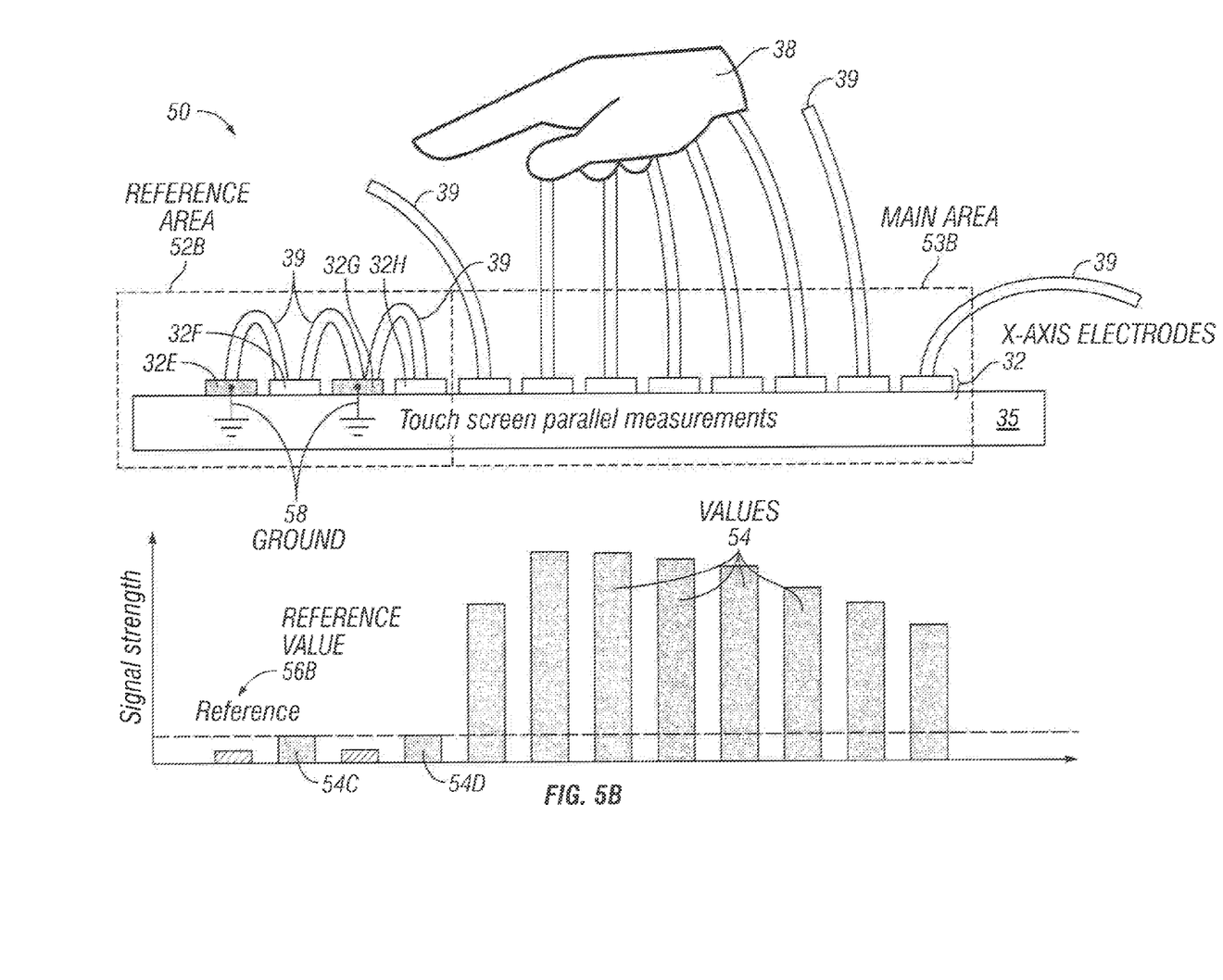

FIGS. 5A-5D illustrate an example touch sensor 50 that performs common mode noise suppression during proximity and hovering detection. FIGS. 5A-5B illustrate side views of x-axis electrodes 32 of FIG. 3, and FIGS. 5C-5I) illustrate side views of y-axis electrodes 34 of FIG. 3. It should be noted that certain portions of FIG. 3 have been omitted and rearranged in FIGS. 5A-5D for clarity. For example, while certain embodiments include both x-axis electrodes 32 and y-axis electrodes 34 as illustrated in FIG. 3, y-axis electrodes 34 are not shown in FIGS. 5A-5B and x-axis electrodes 32 are not shown in FIGS. 5C-5D for simplification purposes. In addition, while substrate 35 is illustrated in FIG. 3 to be above x-axis electrodes 32, FIGS. 5A-5B illustrate substrate 35 as being below x-axis electrodes 32 in FIGS. 5A-5B for simplification purposes.

Touch sensor 50 includes x-axis electrodes 32 ("x-electrodes"), y-axis electrodes 34 ("y-electrodes"), and ground 58. As described in more detail below, one or more values 54 may be determined from one or more reference areas 52 (e.g., 52A-52D) and used to suppress common mode noise from values 54 from main areas 53 (e.g., 53A-53D) of touch sensor 50.

Reference area 52 is any appropriate area of touch sensor 50 and may encompass two or more electrodes 32 or 34. Reference area 52 includes at least one electrode 32 or 34 (e.g., electrodes 32B, 32D, 32E, 32G, 34B, 34D, 34E, and 34G) electrically coupled to a voltage reference 58 (e.g., ground) and at least one electrode 32 or 34 not coupled to voltage reference 58 (e.g., electrodes 32A, 32C, 32F, 32H, 34A, 34C, 34F, and 34H). As used herein, voltage reference 58 may refer to any fixed voltage from any appropriate voltage source. For example, voltage reference 58 may be ground (as illustrated herein) or any other appropriate fixed voltage including, but not limited to, 0.2V or 2V. As used herein, "ground" may refer to a local signal ground which is capacitively or galvanically connected to the real ground (i.e., zero potential).

In some embodiments, reference area 52 is the left, right, middle, top, or bottom portion or side of touch sensor 50 (e.g., the left, right, middle, top, or bottom side of panel 36). For example, reference area 52A is the right side of touch sensor 50 and reference area 52B is the left side of touch sensor 50 in some embodiments as illustrated in FIGS. 5A and 5B, respectively. In certain embodiments, reference area 52A is on an opposite side of panel 36 from reference area 52B. In some embodiments, electrodes within reference area 52 that are coupled to voltage reference 58 (or any other voltage reference) are interleaved with electrodes within reference area 52 that are not coupled to voltage reference 58 (e.g, there are alternating grounded and non-grounded electrodes within reference area 52). For example, reference area 52 may include a chess board pattern of grounded and non-grounded electrodes 32 or 34.

Main area 53 is a portion of touch sensor 50 that is not within reference area 52. For example, if reference area 52A is on the right side of touch sensor 50 and includes x-axis electrodes 32A-32D, as illustrated in FIG. 5A, main area 53A is the remaining left side of touch sensor 50 and includes x-axis electrodes 32 that are not within reference area 52A. As another example, if reference area 52B is on the left side of touch sensor 50 and includes x-axis electrodes 32E-32H, as illustrated in FIG. 5B, main area 53B is the remaining right side of touch sensor 50 and includes x-axis electrodes 32 that are not within reference area 52B.

Values 54 are associated with measured capacitances from electrodes 32 or 34. In some embodiments, values 54 are proportional to values (numbers) obtained from measurements of electrodes 32 or 34. In some embodiments, the values obtained from measurements of electrodes 32 or 34 are relative to some reference such as calibration reference values measured during a calibration state. In some embodiments, the calibration reference values are obtained by recording signals from electrodes 32 and 34 during a calibration stage (e.g., no objects on the surface). The calibration reference values may then be subtracted from signals from electrodes 32 and 34 obtained during normal measurements in order to obtain values 54 as illustrated in FIGS. 5A-5D.

Each value 54 illustrated in FIGS. 5A-5D is associated with the x-axis electrode 32 or the y-axis electrode 34 that is immediately above it. As specific examples, value 54A is from the measured capacitance from x-axis electrode 32A, value 54B is from the measured capacitance from x-axis electrode 32C, value 54C is from the measured capacitance from x-axis electrode 32F, and value 54D is from the measured capacitance from x-axis electrode 32H.

Reference value 56 is a value that is calculated or determined from values 54 from electrodes within reference area 52. For example, reference value 56A is calculated or otherwise determined from values 54A and 54B that are associated with x-axis electrodes 32A and 32C within reference area 52A. As another example, reference value 56B is calculated or otherwise determined from values 54C and 54D that are associated with x-axis electrodes 32F and 32H within reference area 52B. In general, reference value 56 is utilized to suppress common mode noise from values 54 of electrodes within main area 53. For example, reference value 56 is subtracted from values 54 of electrodes within main area 53.

In some embodiments, reference value 56 may be a mean value of the measured values 54 from reference area 52. For example, some embodiments may obtain the mean value of several electrodes with the lowest signals (e.g., sort the signals by value, pick several signals starting from the lowest and continue to highest, and calculate the mean value). As another example, some embodiments may obtain the mean value of several electrodes with highest signal. In some embodiments, reference value 56 may be a minimum or a maximum value of the measured values 54 from reference area 52. In certain embodiments, any other appropriate formula or method may be used to determine reference values 56. In some embodiments, reference value 56 may be multiplied by a scaling coefficient before it is utilized to suppress common mode noise from values 54 of electrodes within main area 53. The scaling coefficient may be any appropriate value such as less than one, equal to one, or greater than one. In some embodiments, the scaling coefficient may be constant or may be a function of some other value such as the amplitude of the signals.

In operation, touch sensor 50 suppresses common mode noise during proximity and hovering by synchronously measuring electrodes within main area 53 and reference area 52 areas. Once electrodes within areas 52 and 53 have been measured, touch sensor 50 determines reference value 56 from reference area 52 and then subtracts reference value 56 from values 54 of electrodes within main area 53. In some embodiments, reference value 56 is multiplied by a scaling coefficient before it is subtracted from values 54 of electrodes within main area 53.

As used herein, "synchronous" or "synchronously" may refer to performing one or more steps of a measurement process simultaneously. For example, when acquiring capacitance values from electrodes 32 and 34, the following process may be performed: 1) initial state; 2) charging state; 3) measuring state which includes sample/hold and analog to digital conversion (ADC). In the sample/hold portion of step 3), the input analog signals to electrodes 32 and 34 are frozen while capacitance values are sampled. In some embodiments, "synchronously measure" may refer to the sample/hold portion of step 3) above in which the input analog signals to all electrodes are simultaneously frozen while capacitance values are sampled. For example, to synchronously measure capacitance values from a reference area of a touch screen and from a main area of the touch screen may refer to simultaneously freezing the input analog signals to electrodes in the reference area and in the main area while sampling capacitances from these electrodes. In such embodiments, steps 1) and 3) of the above process may or may not be performed simultaneously with step 2). For example, the ADC step above may be performed sequentially after step 2) above (e.g., in a pipe line).

During the synchronous measurements of electrodes within main area 53 and reference area 52, the common mode noises will appear in both areas 52 and 53. By subtracting reference value 56 from values 54 of electrodes within main area 53, however, common mode noises may be suppressed without greatly reducing the ability of the touch screen to reliably detect objects that are far away from the screen. For example, common mode noises injected from touch object 38 may be at least partially cancelled because reference area 52 should get less such noises compared to main area 53. In addition, common mode noises introduced by a power supply and all noises which are applied equally to all channels, will also be suppressed.

In some embodiments, a four-step process described below is utilized to suppress common mode noise during proximity and hovering detection. In a first step, a particular side (e.g., left, right, top, or bottom) of a particular set of electrodes (e.g., x-axis electrodes 32 or y-axis electrodes 34) is selected as reference area 52. For example, reference area 52A (on the right side) is selected for x-axis electrodes 32 as illustrated in FIG. 5A. Once reference area 52A is selected or otherwise determined, one or more x-axis electrodes 32 within reference area 52A (e.g., x-axis electrodes 32B and 32D) are coupled to voltage reference 58 as discussed above.

Next, parallel capacitance measurements are taken for x-axis electrodes 32 within reference area 52A and main area 53A in order to determine values 54. The capacitance measurements from x-axis electrodes 32 within reference area 52A (e.g., values 54A and 54B) are then utilized to determine reference value 56A, as discussed above. Reference value 56A may then be utilized to suppress common mode noise from values 54 taken from x-axis electrodes 32 within main area 53A, as discussed above.

In a second step, an opposite side of the electrodes from the first step is selected as reference area 52. In this example, reference area 52B (on the left side) is selected for x-axis electrodes 32 as illustrated in FIG. 5B. Once reference area 52B is selected or otherwise determined, one or more x-axis electrodes 32 within reference area 52B (e.g., x-axis electrodes 32E and 32G) are coupled to voltage reference 58 as discussed above. Next, parallel capacitance measurements are taken for x-axis electrodes 32 within reference area 52B and main area 53B in order to determine values 54. The capacitance measurements from x-axis electrodes 32 within reference area 52B (e.g. values 54C and 54D) are then utilized to determine reference value 56B, as discussed above. Reference value 56B may then be utilized to suppress common mode noise from values 54 taken from x-axis electrodes 32 within main area 53B, as discussed above.

Figure 5C:
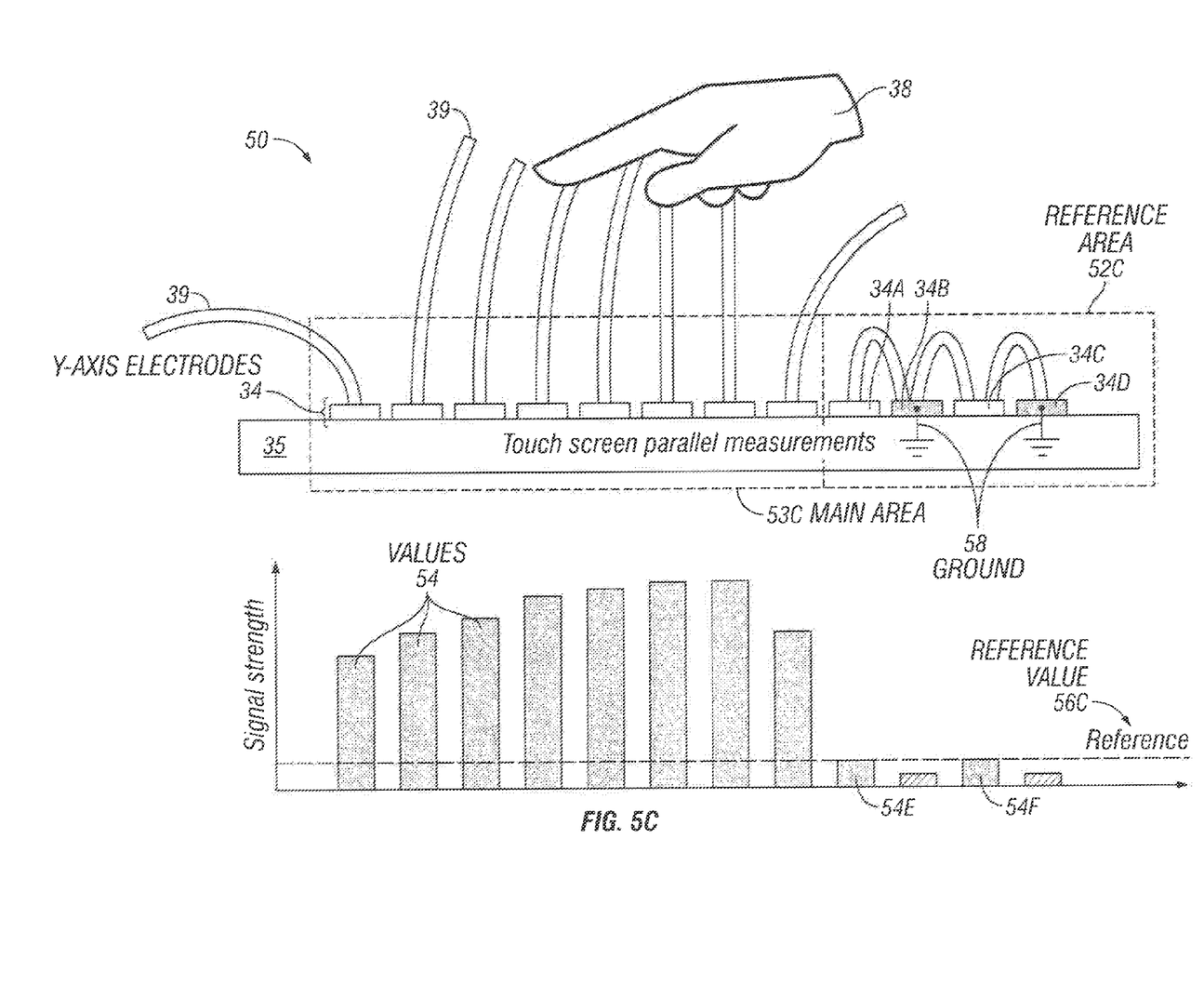

In a third step, a particular side of an opposite set of electrodes from those of step 1 is selected as reference area 52. In this example, a reference area 52C is selected for y-axis electrodes 34, as illustrated in FIG. 5C. Once reference area 52C is selected or otherwise determined, one or more y-axis electrodes 34 within reference area 52C (e.g., y-axis electrodes 34B and 34D) are coupled to voltage reference 58 as discussed above. Next, parallel capacitance measurements are taken for y-axis electrodes 34 within reference area 52C and main area 53C in order to determine values 54. The capacitance measurements from y-axis electrodes 34 within reference area 52C (e.g., values 54E and 54F) are then utilized to determine reference value 56C, as discussed above. Reference value 56C may then be utilized to suppress common mode noise from values 54 taken from y-axis electrodes 34 within main area 53C, as discussed above.

Figure 5D:
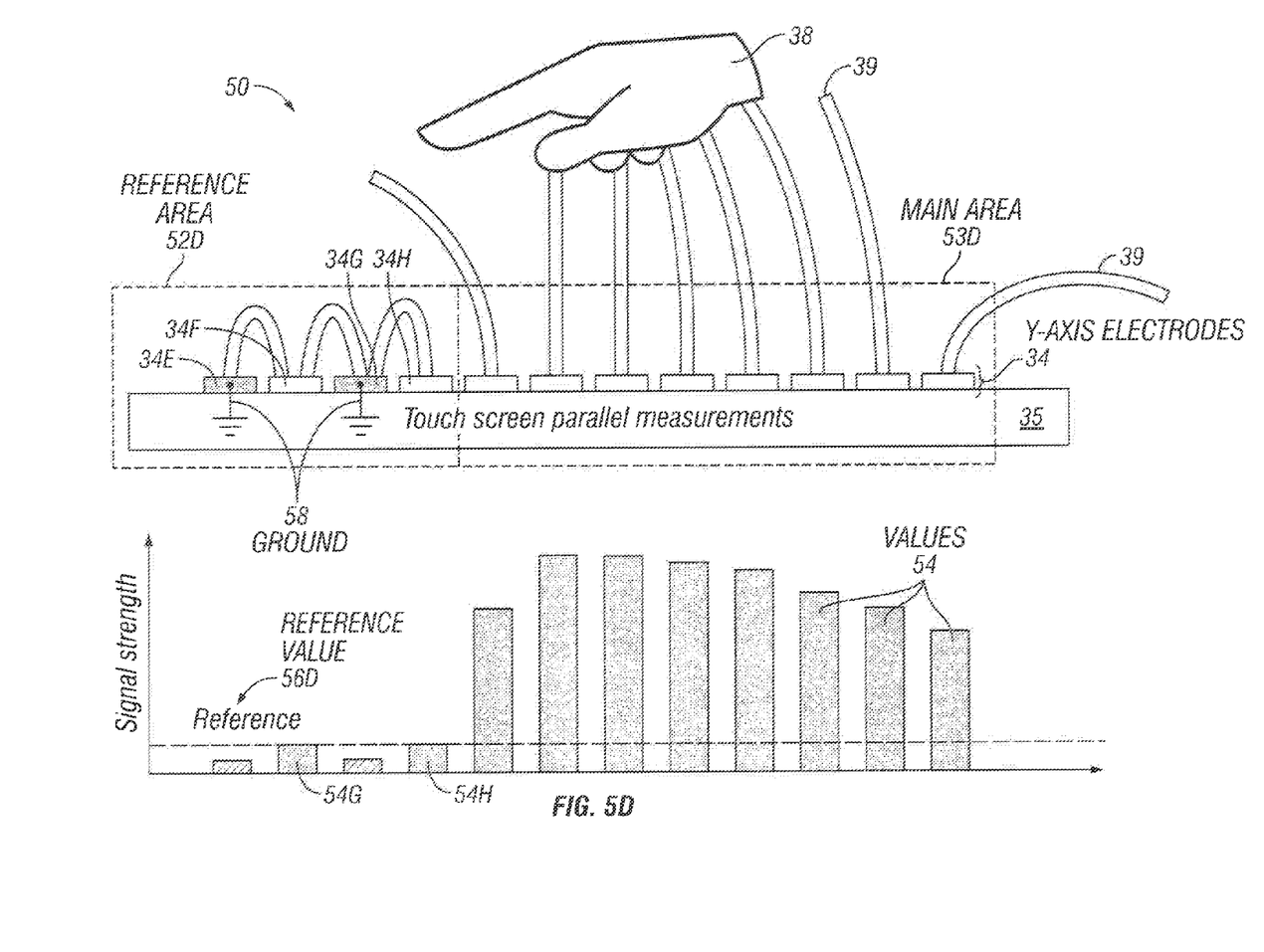

In a fourth step, an opposite side of the electrodes from the third step is selected as reference area 52. In this example, reference area 52D is selected for y-axis electrodes 34 as illustrated in FIG. 5D. Once reference area 52D is selected or otherwise determined, one or more y-axis electrodes 34 within reference area 52D (e.g., y-axis electrodes 34E and 34G) are coupled to voltage reference 58 as discussed above. Next, parallel capacitance measurements are taken for y-axis electrodes 34 within reference area 52D and main area 53D in order to determine values 54. The capacitance measurements from y-axis electrodes 34 within reference area 52D (e.g., values 54G and 54H) are then utilized to determine reference value 56D, as discussed above. Reference value 5D may then be utilized to suppress common mode noise from values 54 taken from y-axis electrodes 34 within main area 53D, as discussed above.

In some embodiments, touch sensor 50 may simultaneously perform multiple of the above steps. For example, touch sensor 50 may simultaneously perform steps one and two and/or steps three and four above. Such embodiments may, however, sacrifice areas around the screen border (i.e., areas around the screen border may become less- or non-sensitive). In some embodiments, touch sensor 50 may simultaneously perform all steps above (i.e., perform steps one through four above in one shot) in order to measure the whole screen in one step and to obtain XY references. Such embodiments may, however, have areas around the screen border that will become non-sensitive.

In some embodiments, a distance between object 38 and the screen of touch sensor 50 may be determined based on the noise-suppressed values 54 of main area 53. For example, touch sensor 50 may correlate noise-suppressed values 54 with a database of values 54 and their related distances. In other embodiments, touch sensor 50 may utilize predetermined formulas for calculating the distance of object 38 based on noise-suppressed values 54. In general, touch sensor 50 may utilize any appropriate technique or algorithm for determining the distance between object 38 and the screen of touch sensor 50 based on the noise-suppressed values 54.

Figure 6:
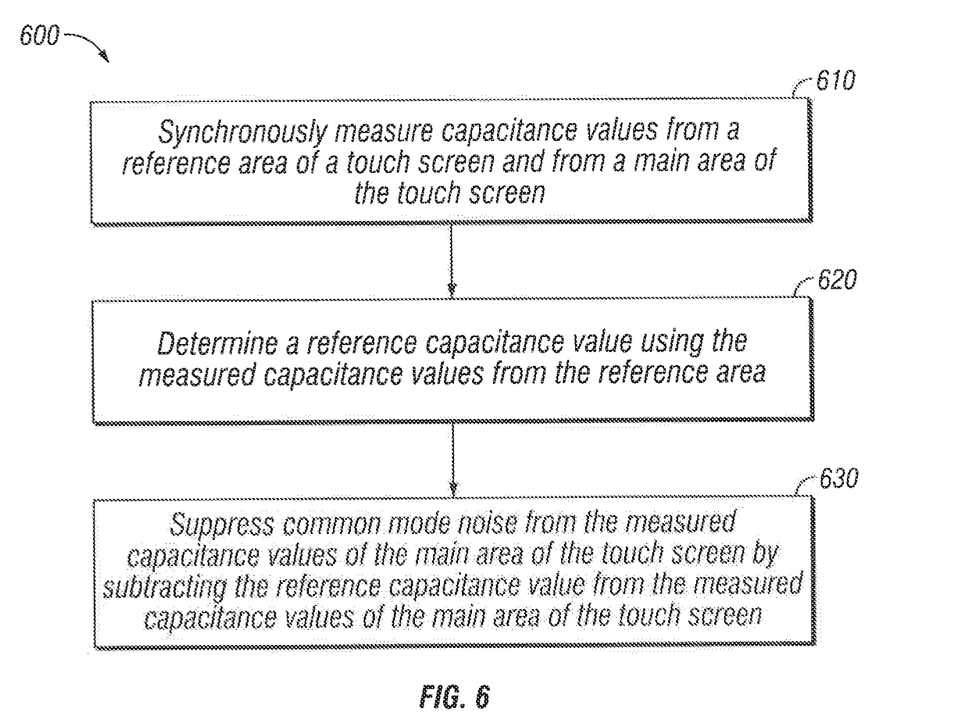
FIG. 6 illustrates an example method that is used in certain embodiments to suppress common mode noise during proximity and hovering detection, according to certain embodiments.

FIG. 6 illustrates an example method 600 that is used in certain embodiments to suppress common mode noise during proximity and hovering detection. Method 600 begins in step 610 where capacitance values from a reference area of a touch screen are synchronously measured with capacitance values from a main area of the touch. In some embodiments, the capacitance values refer to values 54 discussed above. In some embodiments, the reference area is reference area 52 above. In some embodiments, the reference area includes two or more x-axis or y-axis electrodes of the touch screen. In some embodiments, at least one of the electrodes of the reference area is electrically coupled to a voltage reference such as ground. In certain embodiments, the electrodes of the reference area are interleaved as discussed above. In some embodiments, the main area may refer to main area 53 discussed above. In some embodiments, the main area includes at least some electrodes that are not in the reference area of step 610.

In step 620, a reference capacitance value is determined using the measured capacitance values from the reference area of step 610. In some embodiments, the reference capacitance value is reference value 56 discussed above. In some embodiments, the reference capacitance value is determined using any appropriate manner, including those discussed above. For example, the reference capacitance value may be determined by calculating a mean value of the measured values from the reference area. As another example, the reference capacitance value may be determined by calculating a minimum or a maximum value of the measured values from the reference area. In some embodiments, the determined reference capacitance value is multiplied by a scaling coefficient.

In step 630, noise is suppressed from the measured capacitance values of the main area of the touch screen by subtracting the reference capacitance value of step 620 from the measured capacitance values of the main area of the touch screen of step 610. After step 630, some embodiments of method 600 may further include determining a distance between the object and the touch screen based on the noise-suppressed capacitance values of the main area of the touch screen of step 630. In other embodiments, method 600 ends after step 630.

In some embodiments, steps 610-630 of method 600 may be repeated multiple times. For example, steps 610-630 may be performed twice for x-axis electrodes and twice for y-axis electrodes, as discussed in the four-step process above. As a specific example, steps 610-630 may be performed first for a first side of the touch sensor for the x-axis electrodes and then a second time for the opposite side of the touch sensor for the x-axis electrodes. Steps 610-630 may then be performed a third time for a first side of the touch sensor for the y-axis electrodes and then a fourth time for the opposite side of the touch sensor for the y-axis electrodes.

Accordingly, example embodiments disclosed herein provide a touch sensor that suppresses common mode noise during proximity and hovering detection. As a result, devices utilizing embodiments of the disclosed touch sensor may have improved touch accuracy and detection. Accordingly, embodiments of the disclosure provide numerous enhancements over typical touch sensors.

Although the preceding examples given here generally rely on self capacitance or mutual capacitance to operate, other embodiments of the invention will use other technologies, including other capacitance measures, resistance, or other such sense technologies.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A device comprising:
 a controller operable to detect that an object is in proximity to a touch screen comprising a plurality of electrodes, the controller configured to:
  synchronously measure a plurality of capacitance values from a reference area of the touch screen and a plurality of capacitance values from a main area of the touch screen, wherein:
   the reference area comprises a separate physical area on the touch screen from the main area;
   the reference area comprises two or more of the plurality of electrodes, at least one of the electrodes of the reference area being electrically coupled to a voltage reference; and
   the main area comprises at least two or more electrodes of the plurality of electrodes that are not in the reference area;
  determine a reference capacitance value using the plurality of measured capacitance values from the reference area; and
  suppress common mode noise from the plurality of measured capacitance values of the main area of the touch screen by subtracting a capacitance value from each of the plurality of measured capacitance values of the main area of the touch screen, the capacitance value being based on the reference capacitance value.

2. The device of claim 1, wherein electrodes of the reference area that are electrically coupled to the voltage reference are interleaved with electrodes of the reference area that are not coupled to the voltage reference.

3. The device of claim 1, wherein the plurality of electrodes of the touch screen comprises a plurality of x-electrodes and a plurality of y-electrodes.

4. The device of claim 1, wherein determining the reference capacitance value using the plurality of measured capacitance values from the reference area comprises calculating a mean capacitance value of the plurality of measured capacitance values from the reference area.

5. The device of claim 1, wherein determining the reference capacitance value using the plurality of measured capacitance values from the reference area comprises calculating a minimum or a maximum capacitance value of the plurality of measured capacitance values from the reference area.

6. The device of claim 1, wherein detecting that the object is in proximity to the touch screen further comprises multiplying the determined reference capacitance value by a scaling coefficient.

7. The device of claim 1, wherein the controller is further operable to determine, based on the noise-suppressed capacitance values of the main area of the touch screen, a distance between the object and the touch screen.

8. A method comprising:
 by a controller of a touch screen, synchronously measuring a plurality of capacitance values from a reference area of the touch screen and a plurality of capacitance values from a main area of the touch screen, wherein:
  the reference area comprises a separate physical area on the touch screen from the main area;
  the reference area comprises two or more of a plurality of electrodes of the touch screen, at least one of the electrodes of the reference area being electrically coupled to a voltage reference; and
  the main area comprises at least two or more electrodes of the plurality of electrodes that are not in the reference area;
 by the controller of the touch screen, determining a reference capacitance value using the plurality of measured capacitance values from the reference area; and by the controller of the touch screen, suppressing common mode noise from the plurality of measured capacitance values of the main area of the touch screen by subtracting a capacitance value from each of the plurality of measured capacitance values of the main area of the touch screen, the capacitive value being based on the reference capacitive value.

9. The method of claim 8, wherein electrodes of the reference area that are electrically coupled to the voltage reference are interleaved with electrodes of the reference area that are not coupled to the voltage reference.

10. The method of claim 8, wherein the voltage reference comprises ground.

11. The method of claim 8, wherein determining the reference capacitance value using the plurality of measured capacitance values from the reference area comprises calculating a mean capacitance value of the plurality of measured capacitance values from the reference area.

12. The method of claim 8, wherein determining the reference capacitance value using the plurality of measured capacitance values from the reference area comprises calculating a minimum or a maximum capacitance value of the plurality of measured capacitance values from the reference area.

13. The method of claim 8, further comprising multiplying the determined reference capacitance value by a scaling coefficient.

14. The method of claim 8, further comprising determining, based on the noise-suppressed capacitance values of the main area of the touch screen, a distance between the object and the touch screen.

15. A touch-sensitive device comprising a controller, the controller operable to:
   measure a plurality of capacitance values from each of a first, second, third, and fourth reference area of a touch screen, wherein:
      at least one electrode of each reference area is electrically coupled to a voltage reference;
      the first and second reference areas each comprise two or more of a plurality of x-electrodes of the touch screen, the first reference area being on an opposite side of the touch screen from the second reference area; and
      the third and fourth reference areas each comprise two or more of a plurality of y-electrodes of the touch screen, the third reference area being on an opposite side of the touch screen from the fourth reference area;
   measure a plurality of capacitance values from each of a first, second, third, and fourth main area of the touch screen, wherein:
      the first, second, third, and fourth reference areas each comprise a separate physical area on the touch screen, respectively, from the first, second, third, and fourth main areas;
      capacitance values from the first main area are measured synchronously with the capacitance measurements of first reference area;
      capacitance values from the second main area are measured synchronously with the capacitance measurements of second reference area;
      capacitance values from the third main area are measured synchronously with the capacitance measurements of third reference area;
      capacitance values from the fourth main area are measured synchronously with the capacitance measurements of fourth reference area;
   determine a first, second, third, and fourth reference capacitance value using the plurality of measured capacitance values from the first, second, third, and fourth reference areas, respectively; and
   suppress common mode noise from the plurality of measured capacitance values of the first, second, third, and fourth main areas of the touch screen by subtracting, respectively, first, second, third, and fourth capacitance values from each of the plurality of measured capacitance values of the first, second, third, and fourth main areas of the touch screen, the first, second, third, and fourth capacitance value being based on the first, second, third, and fourth reference capacitance values, respectively.

16. The touch-sensitive device of claim 15, wherein electrodes of the first, second, third, and fourth reference areas that are electrically coupled to the voltage reference are interleaved, respectively, with electrodes of the first, second, third, and fourth reference areas that are not electrically coupled to the voltage reference.

17. The touch-sensitive device of claim 15, wherein determining the first, second, third, and fourth reference capacitance values comprises calculating a mean capacitance value of the first, second, third, and fourth measured capacitance values from the first, second, third, and fourth reference areas, respectively.

18. The touch-sensitive device of claim 15, wherein determining the first, second, third, and fourth reference capacitance values comprises calculating a maximum or minimum capacitance value of the first, second, third, and fourth measured capacitance values from the first, second, third, and fourth reference areas, respectively.

19. The touch-sensitive device of claim 15, the controller further operable to multiply the determined reference capacitance values by a scaling coefficient.

20. The touch-sensitive device of claim 15, the controller further operable to determine, based on the noise-suppressed capacitance values of the main area of the touch screen, a distance between the object and the touch screen.

21. The device of claim 6, wherein the scaling coefficient has a value less than one.

22. The device of claim 6, wherein the scaling coefficient has a value greater than one.

23. The device of claim 6, wherein a value of the scaling coefficient is a function of a signal amplitude of one or more measurement signals.

* * * * *